United States Patent [19]
Romagnoli

[11] Patent Number: 4,870,808
[45] Date of Patent: Oct. 3, 1989

[54] VOLUMETRIC DOSING UNIT WITH ADJUSTABLE-VOLUME DOSER CELLS FOR CONTINUOUSLY OPERATING MACHINES PRODUCING DUAL-USE FILTER SACHETS

[75] Inventor: Andrea Romagnoli, San Lazzaro di Savena, Italy

[73] Assignee: CSENTIND - Centro Studi Industriali - S.r.l., Pietro Terme, Italy

[21] Appl. No.: 154,652

[22] Filed: Feb. 10, 1988

[30] Foreign Application Priority Data

Mar. 9, 1987 [IT] Italy .................................. 3377 A/87

[51] Int. Cl.$^4$ ............................................. B65B 29/02
[52] U.S. Cl. ...................................... 53/529; 53/205
[58] Field of Search ............. 53/116, 134, 205, 266 R, 53/272, 257, 529, 523, 439; 493/47

[56] References Cited

U.S. PATENT DOCUMENTS

| | | | |
|---|---|---|---|
| 2,334,256 | 11/1943 | Eaton | 53/134 X |
| 2,368,429 | 1/1945 | Sidebotham | 53/205 X |
| 3,259,029 | 7/1966 | Hall et al. | 493/47 X |
| 3,367,245 | 2/1968 | Wisdom | 493/47 |
| 4,425,107 | 1/1984 | Hall | 493/47 X |

*Primary Examiner*—James F. Coan
*Attorney, Agent, or Firm*—Herbert Dubno

[57] ABSTRACT

A volumetric dosing unit with doser cells or chambers of adjustable volume for continuously operating machines producing dual-use filter sachets for infusion products. The metering unit has a doser with a cylindrical drum rotatable about a horizontal axis and with radial bores opening on its external cylindrical surface. A feeding hopper for the product to be dosed is located above the drum. A compacting element extends from its hopper to the lower deadpoint of the drum tangentially relative to a strip of paper for filter sachets onto which are discharged fractional doses for processing by means of piston elements sliding in the bores. The piston elements are linked to cam control means having an actuator track of adjustable width.

3 Claims, 2 Drawing Sheets

VOLUMETRIC DOSING UNIT WITH ADJUSTABLE-VOLUME DOSER CELLS FOR CONTINUOUSLY OPERATING MACHINES PRODUCING DUAL-USE FILTER SACHETS

FIELD OF THE INVENTION

The present invention relates to a volumetric dosing unit with adjustable-volume doser cells for continuously operating machines producing dual-use filter sachets for infusion products.

BACKGROUND OF THE INVENTION

From the Italian Patent Application No. 3376 A/87 (corresponding to U.S. application Ser. No. 07/154,782 filed concurrently herewith), an automatic machine is known for the continuous production of dual-use filter sachets for infusion products with successive bags or pouches containing fractional doses of such products.

The machine has an operating line provided with a succession of means designed to effect the following steps:

the folding and longitudinal sealing of a strip of thermally weldable filter paper in a horizontally oriented flattened tubular form, thermally welding the tubes in a transverse direction to said tube so as to enclose single fractional doses fed thereto between two transverse thermal welds, application by rotary wheel means with pickup elements of equidistantly spaced labels, a longitudinally continuous thread transversely contacting said labels as well as stickers or tabs of thermally weldable material partly adhered to the backs of the labels, to the flattened tube at alternate transverse thermal welds; and cutting up the tube thus conformed into portions comprising at least two bags, for setting up these bags side by side and for sealing together their extremities.

More particularly, such a dual-use filter-paper sachet with multiple successive or serial bags or pouches each of which contains a corresponding fractional dose or unit quantity of the infusion product, has a structure allowing two modes of use, or in the flattened form collated in lots for sale with the bags or pouches in superimposed or serially stacked arrangement by folding back one bag or pouch over the other or adjacently thereto, and one with an unfolded or extended arrangement of the pouches following an action of pressing and pulling of the corresponding label covering the handling thread of the filter sachet by the user.

The thread has a length substantially equal to the length of the sachet in its arrangement for use in the unfolded mode of bags or pouches, and is fastened to the opposite extremity of said sachet by means of a sticker or tab of thermally weldable material together with the label which is made of a material which is not thermally weldable and arranged to surround longitudinally the exterior of the sachet when said bags or pouches are in the collated position in lots for sale in which the bags are folded back to back.

OBJECTS OF THE INVENTION

The principal object of the present invention is to provide a volumetric dosing unit with adjustable volume doser cells for infusion products, specially adapted for feeding equidistantly spaced fractional doses of said infusion products onto and along the continuously moving strip of thermally weldable filter paper, also contributing to the folding-back of said strip of filter paper thus fed with equidistantly spaced fractional doses of the infusion product while in its flattened tubular form.

Another object of the present invention is to provide such a volumetric dosing unit with adjustable-volume doser cells which can prevent a violent reflux of air into the interior of the cell just emptied of its fractional dose of product and allowing the air to enter gradually into the cell bottom little by little once the progressive expulsion from said cell of the corresponding fractional dose of product is verified.

Yet another object of the present invention is to provide a volumetric dosing unit of a particularly simple and economic construction, taking into consideration the outputs practically attainable therewith.

SUMMARY OF THE INVENTION

These and other objects are achieved with the volumetric dosing unit according to the present invention with adjustable-volume doser cells especially adapted to machines producing dual-use filter sachets for infusion products such as tea, camomile and the like.

The machine comprises means which provide for the progressive longitudinal folding of a strip of thermally weldable filter paper entrained in continuous movement in a flattened tubular form of horizontal orientation, previously fed with equidistantly spaced fractional doses of the infusion products.

Means are provided for folding back the longitudinal edges of said strip of thermally weldable filter paper into a vertical orientation in the form of a longitudinal crest.

The dosing unit is of the type which comprises a cylindrical dosing drum with horizontal rotational axis and having radial bores opening on the external cylindrical surface or mantle, a feeding hopper for the product to be dosed arranged above the said cylindrical dosing drum, and a compacting element extending from said feeder hopper to the lower deadpoint of the drum tangentially relative to the strip of filter paper onto which are discharged the fractional doses to be packed by mean of piston elements sliding in the radially opening bores, from a maximum distance relative to the periphery of the cylindrical dosing drum at the instant of their entering the region of withdrawal therebelow of the product from the feeder hopper to a minimum distance from the said periphery in registration with the upper deadpoint defining the volume of the dosing chambers as far as the aforesaid lower deadpoint.

According to the invention, the piston elements are linked to cam control means having an actuator track of adjustable width and wherein in the walls delimiting the dosing chambers there is provided a corresponding aperture establishing a communication between these chambers and the atmosphere within the region of discharge of the respective fractional doses on the aforesaid strip of filter paper.

BRIEF DESCRIPTION OF THE DRAWING

Further features and advantages of the volumetric dosing unit according to the present invention will be more apparent from the following detailed description, reference being made to the attached drawing in which.

SPECIFIC DESCRIPTION

Figure 1:
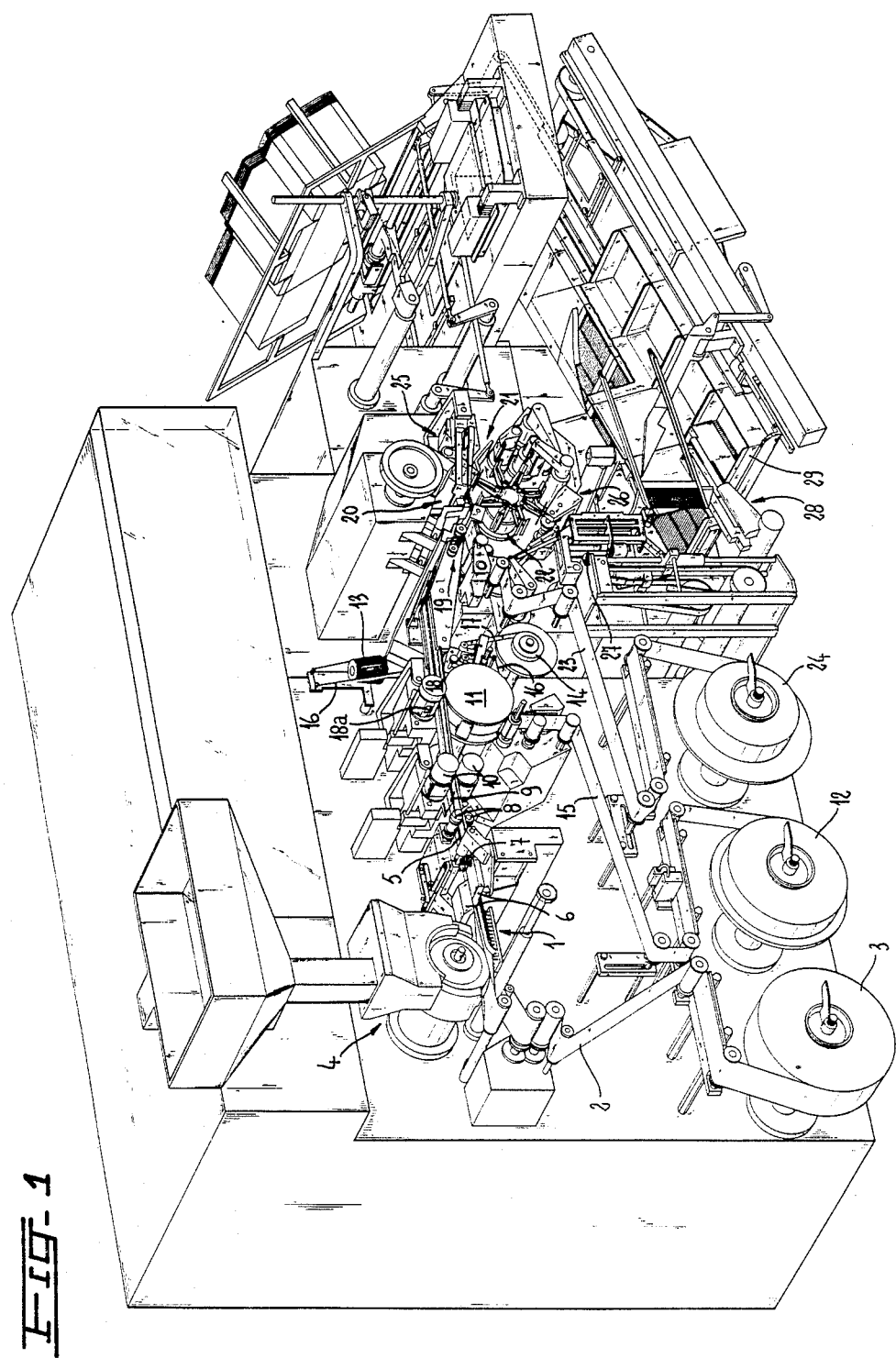
FIG. 1 shows the packaging machine fitted with the volumetric dosing unit according to the invention in a perspective front side view.

The packing machine of FIG. 1 is described in the abovementioned copending application, employing the volumetric dosing unit according to the present invention and illustrates the integrated production line, for the continuous formation of dual-use filter sachets with multiple successive or serial bags or pouches, each containing fractional doses of the infusion product. The bags are folded back to back and fitted with labels and thread for handling by the user with said pouches arranged to extend one following the other, for the production of said individual filter sachets in respective envelopes and for the collating in lots of the filter sachets thus packed in cartons or boxes for storage and sale.

Essentially, the aforesaid integrated production line of said machine is defined by a succession of means which provide for the continuous production of the said dual-use filter sachets.

At an upstream part means 1 are provided for supporting and folding into a substantially flattened tubular form a strip of thermally weldable filter paper 2 fed from a reel 3 in a continuous movement in substantially horizontal orientation.

Along the path of the filter paper 2 is a feeder-dosing means 4 capable of feeding equidistantly spaced fractional doses of the infusion products onto and along the strip of thermally weldable filter paper 2 in continuous motion while the filter paper is folded by the support and folding means 1 into the substantially flattened tubular form with the longitudinal edges of said strip 2 in vertical mutual contact in the form of a longitudinal crest 5.

Multiple-action welding means 6 then effects the thermal welding of the edges in vertical mutual contact arrangement along the longitudinal crest 5. Knurling rollers 7 act on said longitudinal crest 5 and are capable of sealing same by knurling.

Downstream thereof is a means 8 with rollers and counter-rollers, transversely spaced, respectively, to operate laterally relative to said longitudinal sealed-knurled crest 5 on the said continuously moving strip of filter paper in its substantially flattened tubular form for the entrainment of the strip and the maintaining and enhancing the flattening thereof.

The knurled crest is folded back by a folding mean with a leaf spring 9.

Welding rollers and counter-rollers 10 thermally weld transversely the continuously moving strip of filter paper in its flattened tubular form between the fractional doses of infusion material so as to enclose the fractional doses with successive transverse thermal weld.

A wheel or rotary head 11 is fitted with pickup elements for feeding, from respective reels 12, 13, 14 located underneath of and in contact with said strip of filter paper in substantially flattened tubular form in continuous movement, a succession of labels cut from the strip 15 of reel 12, each of said labels being arranged at a distance, from the transverse median line of the alternating transverse thermal welds, a continuous longitudinal thread 16 from the corresponding reel 13 transversely contacting the lower or outer surface of the said succession of labels and a succession of stickers or tabs cut from strip 17 drawn from reel 14 of a thermally weldable material.

The tabs are applied across the said alternating transverse thermal welds, partly to the back of said labels.

A roller 18 with peripherally equidistant thermal pressure elements operates in counter-rotating combination with the wheel or rotary head 11 and is provided with pickup elements so as to thermally weld with the aid of said thermal pressure elements the said thermally weldable stickers or tabs to the thread and the latter to said labels, as well as said thread to the continuously moving strip of filter paper in its flattened tubular form across the alternating thermal welds.

Sectioning means 19 is provided for cutting the continuously moving strip of filter paper in its flattened tubular form, thus fitted with labels, longitudinal thread and thermally weldable stickers or tabs in registration with the aforesaid median transverse line of the alternating transverse thermal welds, into successive portions each containing at least two successive bags or pouches.

A folding and transfer means 20 then folds and transfers the portions of the strip of filter paper in flattened tubular form, each with at least two bags or pouches, relative to the median line of the intervening corresponding transverse thermal weld so as to superimpose or set up said bags or pouches back to back.

Next the thermal welding means 21 joins by thermal welds the respective resulting transversal terminal edges adjoining each other in association with the corresponding stickers or tabs of thermally weldable material.

Rotary wheels 22 with radial pincers forms a means for feeding in and for folding in the shape of a V the portions of paper cut from the strip 23 drawn from reel 24.

A means 25 transfers the filter sachets received in V-folded paper sections to a means 26 for sealing the edges of said portions folded in V-shape to form packs containing the corresponding filter sachets.

A means 27 is provided for stacking these packs and cooperates with a means 28 for transferring the stacks thus collated into cartons or boxes 29 prepared in advance.

Figure 2:
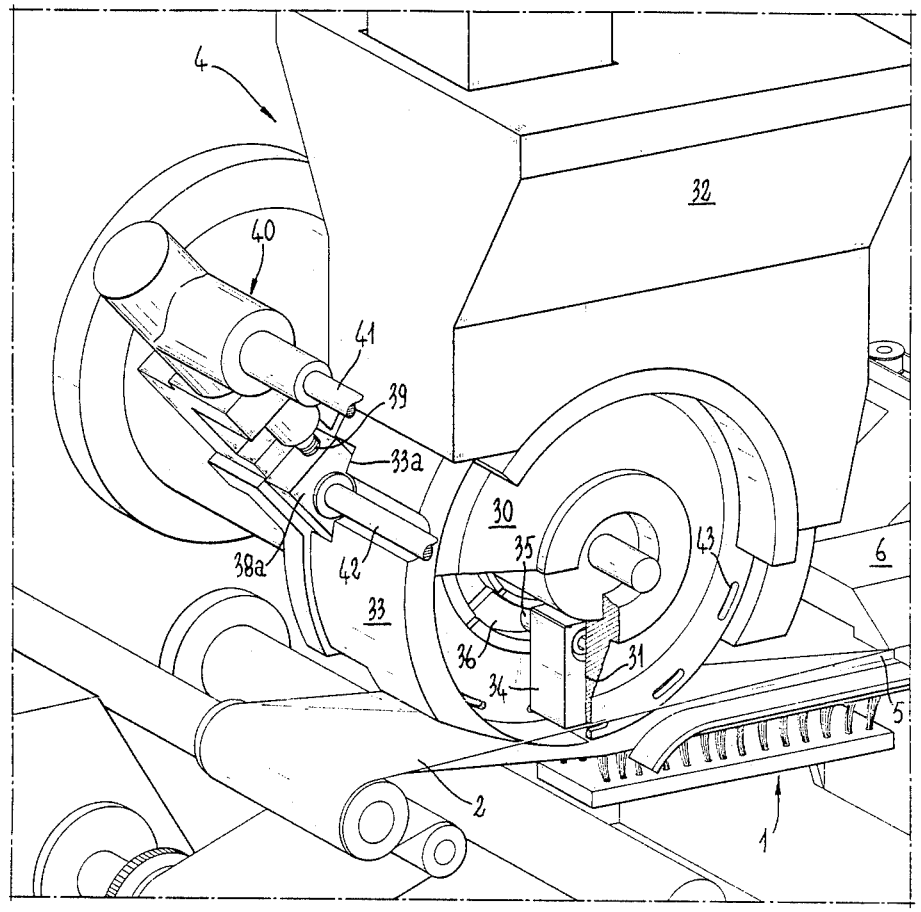
FIG. 2 is an enlarged perspective front and side view of that part of said conditioning machine which involves the volumetric dosing unit according to the invention.
Figure 3:
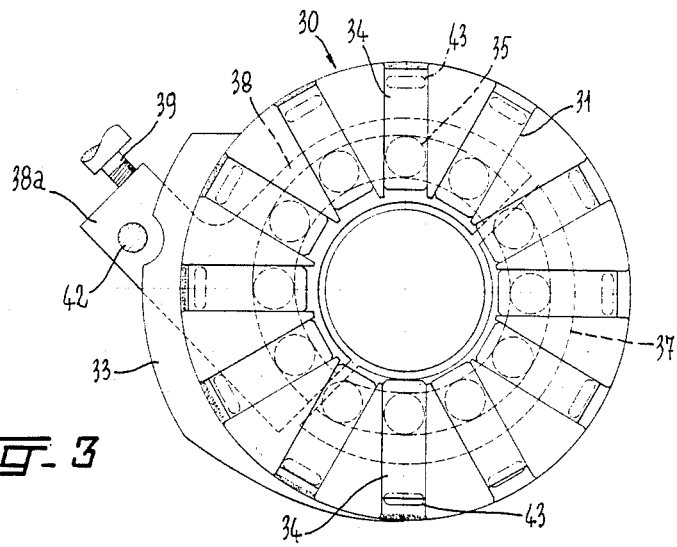
FIG. 3 shows diagrammatically, in a further enlarged scale, the volumetric dosing unit according to the invention as viewed in axial direction.

The feeder dosing means 4 of the production machine essentially comprises a cylindrical dosing drum 30 with a horizontal axis of rotation. The drum has radial bores 3, (see FIGS. 2 and 3) opening onto its external cylindrical surface or mantle, rotating underneath hopper 32 feeding in the product to be dosed.

An arc-segmental compacting element 33 extends from the hopper 32 in tapering form to the lowermost part of the dosing drum 30 and generally lies tangential to the strip of filter paper 2 (see FIGS. 1 and 2) onto which are discharged the fractional doses by means of piston elements 34 sliding in the aforesaid radial bores 31.

In such dosing units, the path of the piston elements 34 is fixed and extends from a maximal distance from the periphery of the dosing drum 30 at the instant of entry of the respective bore underneath the hopper 32 (see the bore in the one-o'clock position in FIG. 3) to receive the product from the feeder hopper 32 (see in particular FIG. 3), to a reduced distance from this same periphery in registration with the upper deadcenter (refer again to FIG. 3)—12 o'clock position, defining in this manner a constant volume of the doser chamber ending in proximity of the lower deadcenter of discharge, so that a variation of the volume or of the quantity of the dose requires the substitution of appropriately formed parts.

To avoid this, and also in order to make it possible to vary, according to requirements, the volume or quantity of the dose without having to substitute appropriately formed parts, the present invention essentially provides for linking these piston elements 34 by a cam-control means having actuating tracks of adjustable width. Specifically, the piston elements are fitted with cam-following rollers 35 running in a cam groove 36 formed on two parts 37 and 38, substantially arcuate and concentric with the rotational axis of the dosing drum 30, of which one, 38, can be caused to approach or move away from the part 37 on a micrometric scale.

For this purpose, the part 38 is fitted with an extension 38a passing to the outside of the compactor 33 through an aperture 33a, in which can be screwed and unscrewed a screw 39 of an actuator unit of a known type known for example in the trade under the Trade Name Poggi Art. 2036, referenced 40, with manual control through the intermediary of an operating knob (not shown in FIGS. 2 and 3) of a corresponding actuator shaft 41. A second shaft 42, manually operable by means of a knob element here not shown, is provided for respectively blocking and unblocking by pressure the extension 38a and thereby the aforesaid half-cam part 38 in the desired registering position.

It is thus obvious that by the screwing and unscrewing of the screw 39 in the extension 38a the semi-cam part 38 is acted on so as to approach or to move away the part 38 to the half-cam part 37 or move it away from the part 37, thus making it possible to reduce or to increase the volume of the dosing chambers as required, without having to exchange parts.

On the front wall of the dosing drum 30, which delimits the dosing chambers and is in registration with each of the latter, an aperture 43 is provided for making the chambers communicate with the atmosphere of the discharge region of the respective fractional doses on the strip of filter paper 2, thus avoiding a violent reflux of air towards the interior of the cell just emptied of its corresponding fractional dose of the product, thus allowing the air to enter gradually from the dosing cameral bottom as soon as the ejection from said chamber of the said corresponding fractional dose has been established.

I claim:

1. An apparatus for making infusion packets, comprising:

means for feeding a strip of thermally weldable filter paper along a transport path;

means for storing a product to be dosed along said path; and a dosing unit beneath said means for storing, said unit including:

a cylindrical dosing drum between said means for storing and said path rotatable about a horizontal axis of rotation, said drum having an uppermost and lowermost positions and being formed with an external cylindrical surface provided with a plurality of circumferentially spaced radial bores for receiving respective fractional doses of the product to be dosed from said means for storing at said uppermost position of said drum, compacting means extending tangentially to said path and running from said means for storing to said path along said cylindrical surface, respective pistons slidable radially in the respective bores; and cam means for displacing the respective pistons between maximum and minimum distances thereof from said surface, each of said pistons being at said maximum distance from said surface as each bore passes beneath said means for storing to receive said product and being at said minimum distance from said surface at said uppermost position to define a volume of said fractional dose of the product to be dosed, said minimum distance being maintained as said drum rotates said bores toward said lowermost position at which said cam means displaces said pistons to deposit the respective frictional dose onto said strip, said cam means being formed with an actuator track of continuously adjustable width, so that the volume of said doses can be varied by varying said width.

2. The apparatus defined in claim 1 wherein each of said bores are provided with corresponding passage means for an air communication of said bores with the atmosphere.

3. The apparatus defined in claim 1 wherein said cam means comprises:

first and second half-cam parts, said first and second half-cam parts being substantially arcuate and concentric with said dosing drum, each of said half-cam parts being provided with a corresponding half-groove;

a respective cam-follower roller on each of said pistons;

manual control means operatively connected with said first half-cam part for radially adjusting the latter with respect to the second half-cam part; and blocking means for respectively blocking and unblocking said first half-cam part.

* * * * *

UNITED STATES PATENT AND TRADEMARK OFFICE
CERTIFICATE OF CORRECTION

PATENT NO. : 4,870,808

DATED : 3 October 1989

INVENTOR(S) : Andrea ROMAGNOLI

It is certified that error appears in the above-identified patent and that said Letters Patent is hereby corrected as shown below:

On the title page item [73], Assignee: "CSENTIND" should read --CESTIND--.

Signed and Sealed this

Second Day of April, 1991

Attest:

HARRY F. MANBECK, JR.

Attesting Officer

Commissioner of Patents and Trademarks